United States Patent
Cowan et al.

(10) Patent No.: US 9,152,412 B2
(45) Date of Patent: Oct. 6, 2015

(54) COMPOSITING DELTAS WHEN MERGING ARTIFACTS IN A VERSION CONTROL SYSTEM

(75) Inventors: Scott D. Cowan, Ottawa (CA); Kim D. Letkeman, Nepean (CA); Mohammed M. Mostafa, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 1383 days.

(21) Appl. No.: 11/297,676

(22) Filed: Dec. 8, 2005

(65) Prior Publication Data

US 2007/0136394 A1    Jun. 14, 2007

(51) Int. Cl.
  *G06F 17/30*    (2006.01)
  *G06F 9/44*    (2006.01)
  *G06F 17/22*    (2006.01)

(52) U.S. Cl.
  CPC .............. *G06F 8/71* (2013.01); *G06F 17/2288* (2013.01)

(58) Field of Classification Search
  CPC ................................ G06F 8/71; G06F 17/2288
  USPC .................................................. 707/203, 695
  See application file for complete search history.

(56) References Cited

U.S. PATENT DOCUMENTS

| | | | | |
|---|---|---|---|---|
| 8,868,524 B2 * | 10/2014 | Letkeman | ..................... | 707/695 |
| 2003/0084424 A1 * | 5/2003 | Reddy et al. | .................. | 717/105 |
| 2005/0268281 A1 * | 12/2005 | Letkeman et al. | ............ | 717/120 |
| 2006/0020360 A1 * | 1/2006 | Wu | ................................ | 700/104 |
| 2006/0117075 A1 * | 6/2006 | Cowan et al. | .................. | 707/203 |
| 2007/0061702 A1 * | 3/2007 | Letkeman | ..................... | 715/511 |

OTHER PUBLICATIONS

Article entitled "Comparing and Merging UML Models in IBM Rational Software Architect, Part I" by Letkeman, dated Jul. 12, 2005.*
Article entitled "Comparing and Merging UML Models in IBM Rational Software Architect, Part II" by Letkeman, dated Jul. 12, 2005.*
Article entitled "Comparing and Merging UML Models in IBM Rational Software Architect, Part III" by Letkeman, dated Aug. 2, 2005.*
Article entitled "Comparing and Merging UML Models in IBM Rational Software Architect, Part IV" by Letkeman, dated Aug. 2, 2005.*
Article entitled "IBM Rational ClearCase/ClearQuest/SDP v2003 SR3/SR4/Atlantic Releases" by Ahmed et al., dated Jan. 5, 2005.*
Article entitled "Using IBM Rational XDE and IBM Rational CLearCase Together" by Achmed, dated Feb. 28, 2003.*

(Continued)

*Primary Examiner* — Mahesh Dwivedi
(74) *Attorney, Agent, or Firm* — Steven M. Greenberg, Esq.; CRGO Law

(57) ABSTRACT

Embodiments of the present invention address deficiencies of the art in respect to merging artifacts in a version control system and provide a novel and non-obvious method, system and computer program product for compositing deltas when merging artifacts in a version control system. In one embodiment, a method for compositing deltas for artifacts can be provided. The method can include generating deltas for a contributor artifact of an ancestor artifact, identifying interrelated ones of the deltas and grouping the interrelated ones of the deltas into a composited set of deltas. The method further can include rendering the composited set of deltas in a hierarchical view of a compare view for a version control data processing system in a development platform.

8 Claims, 3 Drawing Sheets

(56) References Cited

OTHER PUBLICATIONS

Manual entitled "Managing Software Projects with ClearCase" by Rational, dated Aug. 2000.*

User Guide entitled "Workbench User Guide", Copyright 2003, by Eclipse.*

User Guide entitled "Basic Tutorial", by IBM, Copyright 2005.*

Letkeman, *Comparing and Merging UML Models in IBM Rational Software Architect: Part 1*; IBM developerWorks, Jul. 12, 2005.

* cited by examiner

COMPOSITING DELTAS WHEN MERGING ARTIFACTS IN A VERSION CONTROL SYSTEM

BACKGROUND OF THE INVENTION

1. Field of the Invention

The present invention relates to the field of artifact version control and more particularly to merging artifacts in a version control system.

2. Description of the Related Art

Version control relates to the management of different versions of artifacts produced through repetitive editing by one or more end editors. Often referred to in the context of source code development, software model development and configuration management, version control involves the management of one or more documents when the documents are edited in succession, parallel or both by one or more editors. Put plainly, version control addresses one of two likely contingencies. In a first contingency, an editor applies edits to a document in succession and requires a view to changes in the document from an ancestor version to a contemporary version. In the other contingency, one or more editors concurrently apply different edits to the same document and the edits must be merged into a unified document.

Merging is a common operation when working with versioned artifacts in a version control system. Wherever two or more editors apply edits to the same version of a file in parallel, a merge is required to harmonize the edits the parallel artifacts. Merging unstructured textual artifacts can be a relatively simple operation because within an unstructured textual artifact, there is no relationship from one line to the next. By comparison, merging a structured artifact such as source code or markup can be trying, as the skilled artisan will attest.

Notably, when editing an artifact, a simple line to line change can affect the integrity of structures or objects specified within the artifact. In this regard, the more structural the file content, the worse the problem because relationships between structures within an artifact must be maintained during a merge operation in order to protect the integrity of the artifact. Exacerbating matters, each element in an artifact can have multiple properties, each of which can contain or reference one or more other elements in the artifact. As other relationships can exist only in source code, the structure of an artifact can become exceedingly complex—so much so that attempting to edit the artifact within a mere text editor can virtually guarantee the corruption of the artifact as has been demonstrated by sufficient empirical evidence.

Thus, more sophisticated visual merge tools have become the preferred mode of performing a merge operation. The use of a visual merge tool in a version control system, however, is not without its own set of challenges. In this regard, each individual change can appear within the visual merge tool as a single artifact difference referred to in the art as a "delta". Yet, each individual change to an element in an artifact by a contributor reflected by a delta can be a candidate for conflict in view of a possible change to the same element by another contributor in another version of the artifact.

Significantly, a single user gesture in editing an artifact, such as the creation of an association between two classes, can generate related changes to many elements and attributes in an artifact thereby producing a multiplicity of deltas for the single gesture—all dependent upon one another. As such, accepting only a portion of the deltas associated with the gesture, but not all of the deltas for the gesture, can result in corruption in an underlying model. To compound matters, resolving a conflict of deltas in favor of an edit to an element in an artifact version by one contributor while resolving a related conflict for one of the deltas in favor of another edit to a different element in a different artifact version by another contributor further can corrupt the model specified in the artifact.

Multiple deltas produced by a single gesture further can provide additional challenges in the form of user interface clutter. Specifically, a single gesture to a model can produce a multiplicity of individual deltas which are visualized in a window in a user interface. As a result, where the list of deltas becomes excessive, the inter-relationships between the deltas may not be apparent from the deltas themselves. Consequently, substantial confusion can be produced resulting in the creation of a logically inaccurate model. Contemporary merge tools are known to produce such clutter by grouping deltas by semantic differences rather than diagram difference. In fairness, however, diagram changes in a merge tool can be difficult to merge because the individual deltas resulting from the diagram change have little context.

BRIEF SUMMARY OF THE INVENTION

Embodiments of the present invention address deficiencies of the art in respect to merging artifacts in a version control system and provide a novel and non-obvious method, system and computer program product for compositing deltas when merging artifacts in a version control system. In one embodiment, a method for compositing deltas for artifacts can be provided. The method can include generating deltas for a contributor artifact of an ancestor artifact, identifying inter-related ones of the deltas and grouping the interrelated ones of the deltas into a composited set of deltas. The method further can include rendering the composited set of deltas in a hierarchical view of a compare view for a version control data processing system in a development platform.

In one aspect of the embodiment, the method further can include enforcing a conflict resolution operation for one of the deltas in the composited set of deltas for all deltas in the composited set of deltas. For instance, enforcing a conflict resolution operation for one of the deltas in the composited set of deltas for all deltas in the composited set of deltas can include accepting all deltas in the composited set of deltas during conflict resolution responsive to accepting one of the deltas in the composited set of deltas, and rejecting all deltas in the composited set of deltas during conflict resolution responsive to accepting one of the deltas in the composited set of deltas. In another aspect of the invention, the method further can include cascading a conflict resolution operation for one of the deltas for the contributor artifact for a composited set of deltas for another contributor artifact of the ancestor artifact.

Identifying interrelated ones of the deltas can include loading strategies for identifying interrelated deltas, and applying the strategies to the generated deltas to identify interrelated ones of the generated deltas. In this regard, loading strategies for identifying interrelated deltas, can include loading at least one of a notational composite delta strategy and a semantic composite delta strategy. Finally, grouping the interrelated ones of the deltas into a composited set of deltas, further can include rendering an iconic indicator adjacent to the rendered composited set of deltas in the hierarchical view.

Another embodiment of the invention can include a version control data processing system. The version control data processing system can included a compare view, and composite delta management logic coupled to the compare view. The composite delta management logic can include program code enabled to generate deltas for a contributor artifact of an ancestor artifact, identify interrelated ones of the deltas, group the interrelated ones of the deltas into a composited set of deltas, and render the composited set of deltas in the compare view which can be disposed in a development platform. Notably, strategies can be coupled to the composite delta management logic that identify interrelated ones of the deltas.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for compositing deltas when merging artifacts in a version control system. In accordance with an embodiment of the present invention, deltas produced between different versions of an artifact can be analyzed and grouped according to one or more grouping strategies. Each grouped set of deltas, referred to herein as a composited set of deltas, can be managed during conflict resolution only as a group. In this way, the individual deltas in a composited set of deltas cannot be managed separately from the other individual deltas in the composited set of deltas where the deltas relate to a single gesture, or where the deltas cannot be individually managed without jeopardizing the integrity of the artifact.

Figure 1:
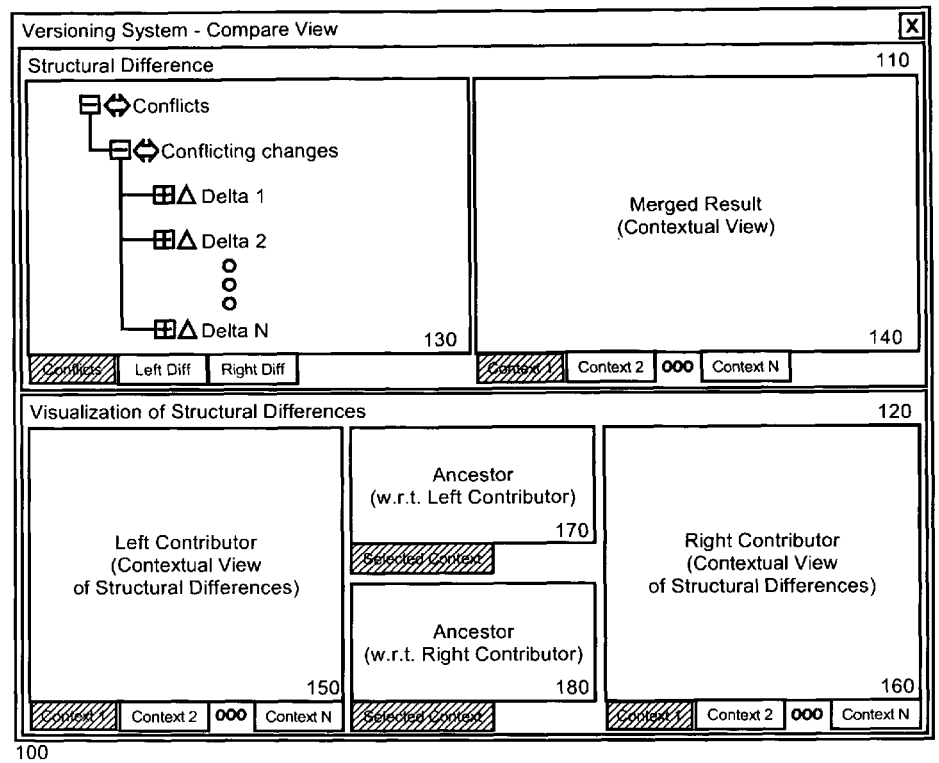
FIG. 1 is a pictorial illustration of a version control system user interface configured for compositing deltas when merging artifacts.

In one embodiment, a set of deltas can be composited and managed within a compare view of a versioning system. As an example, FIG. 1 is a pictorial illustration of a version control system user interface configured for compositing deltas when merging artifacts. As shown in FIG. 1, a compare view 100 of a versioning system in a development platform can be bifurcated into a structural differences view 110 and a visualization view 120 of structural differences. The structural differences view 110 can include a hierarchical view 130 of the structural differences and a contextual view of a merged result 140 following a merge operation for structural differences between the ancestor artifact and two different versions of the ancestor artifact. The visualization view 120, in turn, can include contributor views 150, 160 and respective ancestor views 170, 180 for each of the contributor views 150, 160.

Within the structural differences view 110, the hierarchical view 130 can include a hierarchical rendering of differences between an artifact version, referred to as a "contributor", and an ancestor artifact of the contributor. Each difference, known in the art as a delta, can represent a change in the contributor from the ancestor artifact. The change can range from a format change such as a font change, to an architectural change such as the deletion of an object from a model. Notably, the hierarchical rendering of differences can be provided for multiple contributors, which in the case of comparing two different versions of an ancestor artifact, can include a "left" contributor and a "right" contributor for ease of reference.

Each hierarchical rendering for a contributor can be selected through a tab structure provided for the hierarchical view 130. In addition, the tab structure can provide for the selection of a hierarchical rendering of conflicts among differences for different contributors as shown in FIG. 1. The hierarchical rendering of conflicts can include a listing of deltas for each of the contributors which conflict as it is well known in the art. Through the hierarchical view 130, individual conflicting deltas can be readily identified such that the conflicting deltas can be resolved in favor of one of the contributors. In particular, through the hierarchical view 130, a delta for a left contributor can be accepted or rejected in view of a conflicting delta for a right contributor.

Within the visualization view 120, a contextual view of the structural differences for a contributor can be provided. In this regard, each of the contributor views 150, 160 can include a contextual rendering of deltas for each respective contributor when compared to the ancestor for the respective contributor. The contextual rendering can range from an expandable tree view, to a properties view, to a textual view, to a diagrammatic view. The desired contextual view can be selected through the operation of a tab control for each of the contributor views 150, 160. Finally, to facilitate the recognition of a delta for a contributor artifact, a corresponding ancestor view 170, 180 can be provided for each contributor view 150, 160. Specifically, each delta for a contributor artifact in one of the contributor views 150, 160, when selected, can be visually linked to a position in a corresponding one of the ancestor views 170, 180.

Figure 2:
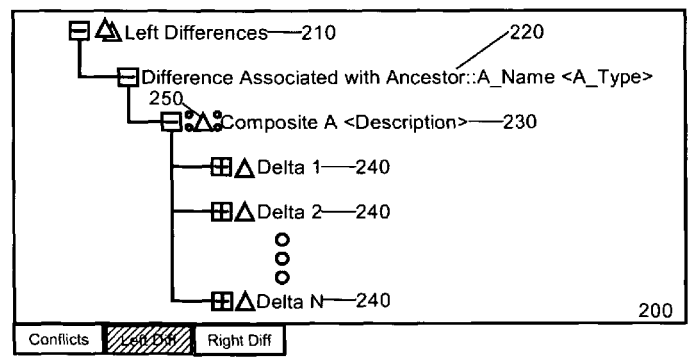
FIG. 2 is a pictorial illustration of a structural difference view incorporating composited deltas in the version control user interface of FIG. 1.

Importantly, the hierarchical rendering of conflicting deltas in the hierarchical view 130 can include at least one set of composited deltas. In illustration, FIG. 2 depicts a structural difference view 200 for a contributor which incorporates composited deltas in the version control user interface of FIG. 1. As shown in FIG. 2, the structural difference view can include a hierarchical rendering of differences 210 between the contributor artifact and a corresponding ancestor artifact. The differences 210 can be hierarchically structured in different branches 220 for different changed portions of the ancestor reflected in the contributor artifact. At least one of the branches can include a composited set of deltas 230.

The composited set of deltas 230 can include a grouping of deltas 240 which are recognized according to a pre-defined grouping strategy. The pre-defined grouping strategy can identify deltas which interrelate to one another in a meaningful way. Examples of meaningful interrelations include those deltas which have been generated as a result of a single gesture such as a drag-and-drop action on a symbol in a diagrammatic contextual view of the contributor artifact, or an insert action in a hierarchical contextual view of the contributor artifact, or a formatting action in a properties contextual view of the contributor artifact. Other meaningful interrelations include those deltas which must be manipulated together in a coordinated fashion so as to preserve the integrity of the contributor artifact and to avoid an unexpected operating condition. To visualize the presence of a composited set of deltas 230, an iconic indicator 250 can be provided adjacent to the composited set of deltas 230 in the structural difference view 200.

Figure 3:
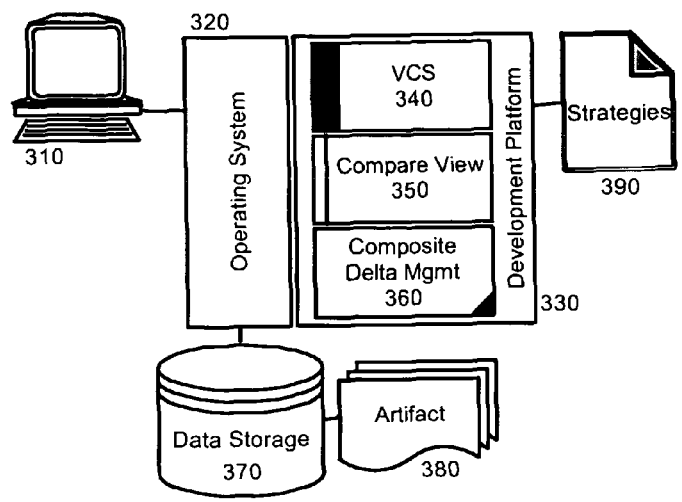
FIG. 3 is a schematic illustration of a development platform data processing system configured for compositing deltas when merging artifacts in a version control system.

The structural difference view 200 can be provided as part of a version control system in a development platform data processing system. In further illustration, FIG. 3 is a schematic illustration of a development platform data processing system configured for compositing deltas when merging artifacts in a version control system. The development platform data processing system 310 can include data storage 370 and an operating system 320 hosting the operation of a development platform 330. Development platforms generally are well-known and can include integrated development environments including the Eclipse™ development environment produced by the Eclipse Foundation and amply described and distributed through the Web site referenced at the Internet domain eclipse.org.

The development platform can include a version control system 340 which can provide for a compare view 350. The compare view 350 can be enabled to compare a contributor artifact with an ancestor artifact among a set of artifacts 380 in order to visualize deltas between the artifacts. Examples include changes in a model, changes in a text document, and changes in properties for objects in a model. The compare view 350 further can be enabled to compare differences in two or more contributor artifacts with a common ancestor artifact so as to identify conflicting deltas among the contributor artifacts. Finally, the compare view 350 can provide one or more operations for resolving conflicting deltas in a merge operation. To that end, the compare view 350 can incorporate functionality prevalent in many version control systems such as those present in the IBM Rational ClearCase™ software configuration management product manufactured by International Business Machines Corporation of Armonk, N.Y., United States of America.

In accordance with the present invention, composite delta management logic 360 can be coupled to the compare view 350. The composite delta management logic 360 can include program code enabled to group individual, interrelated deltas detected between a contributor artifact and ancestor artifact among the artifacts 380. The grouping of the interrelated deltas can be specified according to one or more strategies 390. Each of the strategies 390 can specify criteria for identifying interrelated deltas. Generally, the strategies 390 can be defined in order to identify sets of deltas produced through a single gesture performed through the development platform 330, or sets of deltas which depend upon one another explicitly or implicitly such that the modification of only a few of the deltas in the set of deltas can jeopardize the integrity of the artifact causing an unexpected error condition in the development platform 330.

By way of example, the strategies 390 can include both notational composite delta strategies and semantic composite delta strategies. The notational composite delta strategies can include a relationship composite delta strategy that groups all deltas related to a single change to an edge between two objects in a diagram within the artifact. The notational composite delta strategies further can include a machine diagram composite delta strategy that groups all deltas on a state machine, sequence or activity diagram within the artifact. The notational composite delta strategies yet further can include a canonical composite delta strategy that ties a canonical notational element to a semantic element representing the notational element.

Likewise, the semantic composite delta strategies can include an opposite reference strategy that ties added or deleted element pairs together if the elements in the pair reference one another. Similarly, a required single feature composite strategy ties a delete and related add together when both occupy a single feature requiring a particular value. Finally, the semantic composite delta strategies can include a hierarchical package composite strategy that groups all deltas by package which can be recursively traversed to create a full hierarchy of deltas. In any case, it is to be recognized by the skilled artisan that the foregoing list of strategies is by no way limiting and represents only an exemplary set of strategies for use in compositing deltas in a set.

Figure 4:
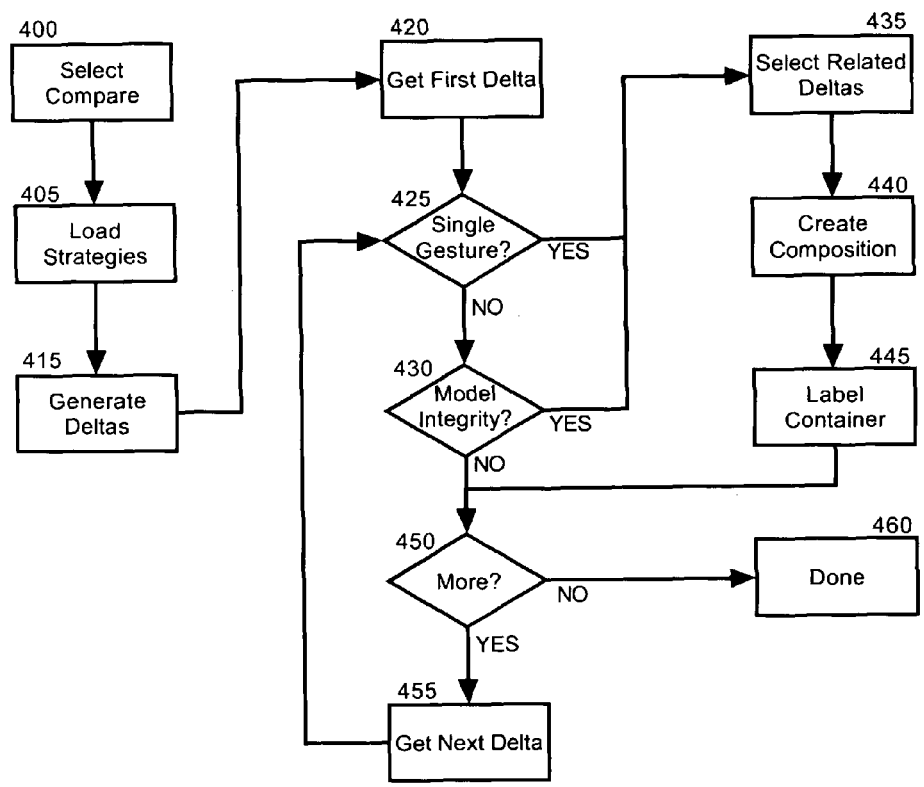
FIG. 4 is a flow chart illustrating a process for compositing deltas when merging artifacts in the data processing system of FIG. 3; and, FIG. 5 is a flow chart illustrating a process for managing cascaded composited deltas in the data processing system of FIG. 3.

Turning now to FIG. 4, a flow chart is shown that illustrates a process for compositing deltas when merging artifacts in the version control data processing system of FIG. 3. Beginning in block 400, a compare operation can be activated for a contributor artifact in the version control data processing system responsive to which a set of compositing strategies 405 can be loaded into memory. In block 415, one or more deltas can be generated for the contributor artifact, subsequent to which, in block 420, a first delta generated for the contributor artifact can be selected for processing according to the loaded strategies.

In decision blocks 425 and 430, the strategies can be consulted to determine whether the selected delta is part of a set of deltas produced in consequence of a single gesture, or whether the selected delta is part of a set of deltas which are interrelated such that the set of deltas must be modified in concert to maintain the integrity of a model represented within the contributor artifact. If so, in block 435, all deltas related to the selected delta can be further selected and grouped into a composition in block 440. The composited set of deltas of block 440 can be disposed in a single container which can be labeled for identification in block 445.

The processing of compositing deltas can repeat through blocks 450 and 455 for additional deltas satisfying an interrelationship defined within one or more of the loaded strategies. When no further deltas remain to be processed, the process can end in block 460 and the composited deltas can be rendered within a hierarchical view of deltas for a contributor artifact in the compare view of the version control data processing system. In this regard, each of the composited deltas can be associated with an iconic indicator reflecting the composited nature of the deltas.

Subsequently, a conflict resolution operation applied to any delta within a set of composited deltas can be limited to the application of the operation to all deltas in the set of composited deltas. Moreover, the application of the operation to all deltas in the set of composited deltas can cascade across other sets of composited deltas where a delta affected by the operation in another contributor artifact is composited as well. In this regard, a hierarchy of composited sets of deltas can be visualized for multiple composited sets of deltas which interrelate through common relationships. As such, in a hierarchy of a multiple composited sets of deltas, a conflict resolution operation applied to the highest composited set of deltas in the hierarchy governs the application of the conflict resolution operation to all deltas in all other composited sets of deltas in the hierarchy.

It is also to be recognized that any one delta in a composited set of deltas can have a prerequisite or dependent delta outside of the composited set of deltas which can require the uniform application of a conflict resolution operation on both deltas. In the case where the prerequisite or dependent delta is a member of a different composited set of deltas, the uniform application of the conflict resolution operation can trigger a cascading application of the conflict resolution operation into the different composited set of deltas. In more particular illustration, FIG. 5 is a flow chart illustrating a process for managing cascaded composited deltas in the data processing system of FIG. 3.

Figure 5:
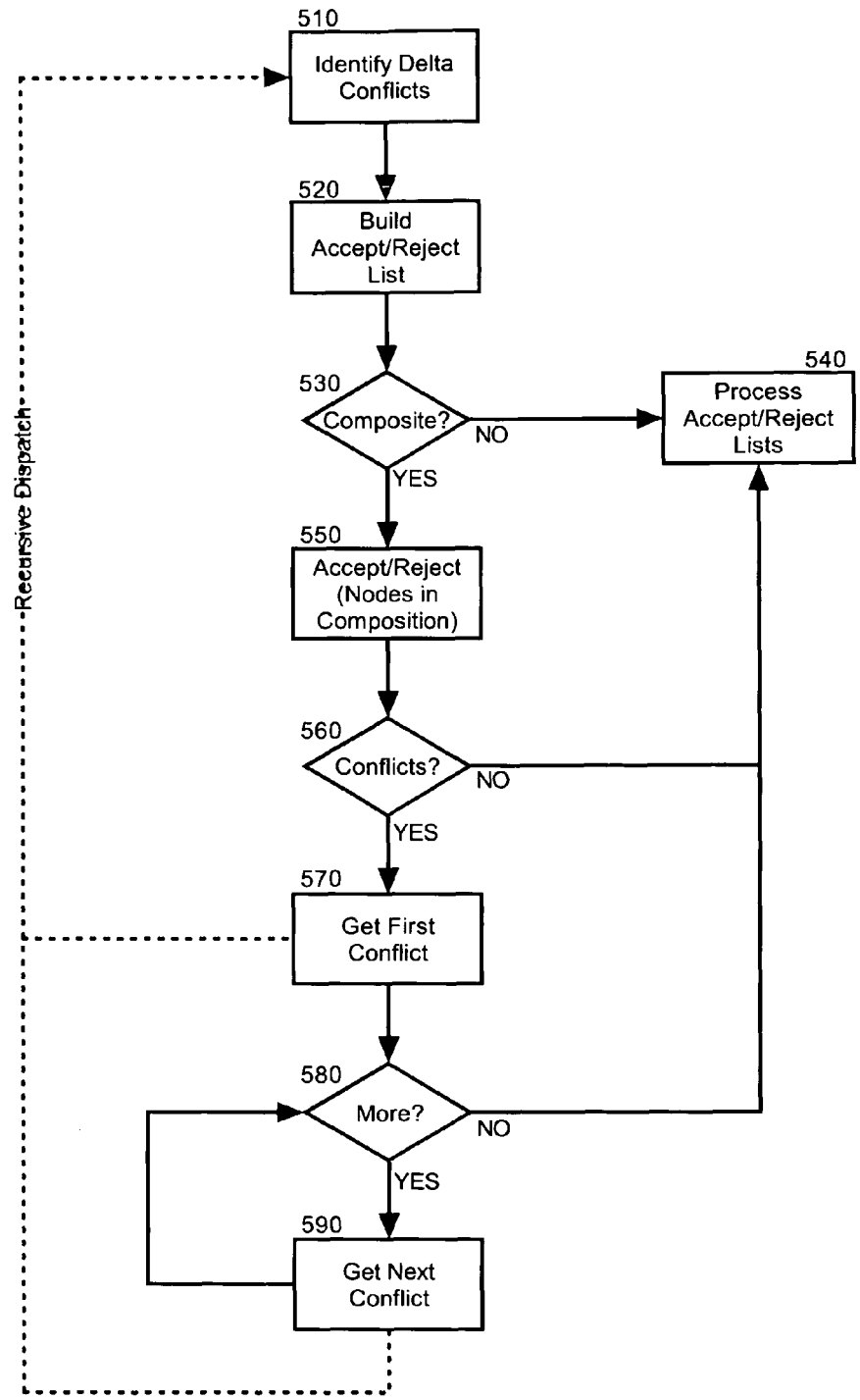

Referring to FIG. 5, in the course of conflict resolution during a merge operation in a compare view of a version control data processing system, beginning in block 510, conflicting deltas can be identified for different contributor artifacts of a common ancestor artifact. For each different delta in a contributor artifact, the delta can be accepted or rejected resulting in rejection or acceptance of a counterpart delta in a corresponding contributor artifact. As such, in block 520 an accept/reject list can be constructed. The execution of the accept/reject list, however, can depend upon the presence of a composited set of deltas among the deltas in the accept/reject list.

Specifically, in decision block 530, for each delta in the accept/reject list, if the delta in the accept/reject list is a member of a composited set of deltas, in block 550 all of the deltas in the composited set of deltas can be accepted or rejected as the case may be. Moreover, in decision block 560, if any of the deltas in the composited set of deltas are conflicted in comparison to a counterpart delta for the corresponding contributor artifact, in block 570, the first counterpart delta in the corresponding contributor artifact can be processed through block 510 as a recursive dispatch. Likewise, in decision block 580 if additional deltas in the composited set of deltas are conflicted in comparison to a counterpart delta for the corresponding contributor artifact, in block 590, the additional deltas can be processed through block 510 recursively. Only when no further conflicting deltas remain, in block 540 the accept/reject list for the conflicting deltas can be executed. In this way, the merging of a composited delta during conflict resolution can cascade to composited sets of deltas of the corresponding contributor artifact.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for compositing deltas for artifacts, the method comprising:
   generating in a compare view of a versioning system executing in memory of a computer, a plurality of deltas for a contributor artifact of an ancestor artifact and the ancestor artifact;
   identifying by a processor of the computer interrelated ones of the deltas;
   grouping by the processor in the compare view the interrelated ones of the deltas into a composited set of deltas; and,
   managing by the processor the composited set of deltas as a group while disallowing managing of individual ones of the interrelated deltas in the composited set of deltas.

2. The method of claim 1, further comprising rendering the composited set of deltas in a hierarchical view of a compare view for a version control data processing system in a development platform.

3. The method of claim 2, further comprising enforcing a conflict resolution operation for one of the deltas in the composited set of deltas for all deltas in the composited set of deltas.

4. The method of claim 3, further comprising cascading a conflict resolution operation for one of the deltas for the contributor artifact for a composited set of deltas for another contributor artifact of the ancestor artifact.

5. The method of claim 1, wherein identifying interrelated ones of the deltas, comprises:
   loading a plurality of strategies for identifying interrelated deltas; and,
   applying the strategies to the generated deltas to identify interrelated ones of the generated deltas.

6. The method of claim 5, wherein loading a plurality of strategies for identifying interrelated deltas, comprises loading at least one strategy selected from the group consisting of a notational composite delta strategy and a semantic composite delta strategy.

7. The method of claim 3, wherein enforcing a conflict resolution operation for one of the deltas in the composited set of deltas for all deltas in the composited set of deltas, comprises:
   accepting all deltas in the composited set of deltas during conflict resolution responsive to accepting one of the deltas in the composited set of deltas; and,
   rejecting all deltas in the composited set of deltas during conflict resolution responsive to rejecting one of the deltas in the composited set of deltas.

8. The method of claim 1, wherein grouping the interrelated ones of the deltas into a composited set of deltas, further comprises rendering an iconic indicator adjacent to the rendered composited set of deltas in a hierarchical view.

* * * * *